(12) United States Patent
Zhang et al.

(10) Patent No.: US 8,193,797 B2
(45) Date of Patent: Jun. 5, 2012

(54) SELF-OSCILLATING SWITCHED MODE CONVERTER WITH VALLEY DETECTION

(75) Inventors: Cheng Zhang, Nijmegen (NL); Wilhelmus H. M. Langeslag, Wijchen (NL)

(73) Assignee: NXP B.V., Eindhoven (NL)

( * ) Notice: Subject to any disclaimer, the term of this patent is extended or adjusted under 35 U.S.C. 154(b) by 40 days.

(21) Appl. No.: 12/988,061

(22) PCT Filed: Apr. 14, 2009

(86) PCT No.: PCT/IB2009/051547
§ 371 (c)(1),
(2), (4) Date: Oct. 15, 2010

(87) PCT Pub. No.: WO2009/128023
PCT Pub. Date: Oct. 22, 2009

(65) Prior Publication Data
US 2011/0031949 A1    Feb. 10, 2011

(30) Foreign Application Priority Data
Apr. 16, 2008  (EP) .................... 08103581

(51) Int. Cl.
*G05F 1/00* (2006.01)
(52) U.S. Cl. ........................... 323/283; 323/282
(58) Field of Classification Search .......... 323/222, 323/271, 282, 283, 284, 285
See application file for complete search history.

(56) References Cited

U.S. PATENT DOCUMENTS

| | | | |
|---|---|---|---|
| 6,624,401 B2* | 9/2003 | Kitaizumi et al. | 219/716 |
| 7,042,203 B2* | 5/2006 | Van Der Horn et al. | 323/285 |
| 7,299,006 B1* | 11/2007 | Rofougaran et al. | 455/20 |
| 2007/0121352 A1 | 5/2007 | Yang et al. | |
| 2007/0257643 A1* | 11/2007 | Chen et al. | 323/222 |
| 2008/0123377 A1 | 5/2008 | Lin | |

FOREIGN PATENT DOCUMENTS

| | | |
|---|---|---|
| WO | 01/78467 A1 | 10/2001 |
| WO | 2005/041395 A1 | 5/2005 |
| WO | 2009/138908 A1 | 11/2009 |

OTHER PUBLICATIONS

NXP; "TEA1750, Greenchip III SMPS Control IC"; Product Data Sheet, Rev. 02; 29 Pages; (Dec. 15, 2008).
Philips; "TEA1507, Greenchip II SMPS Control IC"; Product Data Sheet; 20 Pages (Dec. 5, 2000).
Liang, Sun, et al; "The Circuit With Valley Switching Technique"; IEEE Conference on Electron Devices and Solid-State Circuits; IEEE, Piscataway, NJ, US; pp. 941-943 (Dec. 20, 2007).
NXP; UBA3070, LED Backlight Driver IC; Product Data Sheet, Rev. 02; 13 Pages; (Dec. 2, 2008).
International Search Report and Written Opinion for Application PCT/IB2009/051547 (Apr. 14, 2009).

* cited by examiner

*Primary Examiner* — Adolf Berhane
*Assistant Examiner* — Nguyen Tran

(57) ABSTRACT

An energy converter is disclosed in which self oscillation mode operation is improved by a closed loop feedback control. The feedback control utilizes the voltage error from the voltage valley in the drain voltage (Vdrain) of the converter switch (1), to determine an error (E(n)) in the time domain. Control circuitry (61, 62, 63) is used to minimize this time-domain error (E(n)) to optimize the control of the switch mode converter.

29 Claims, 9 Drawing Sheets

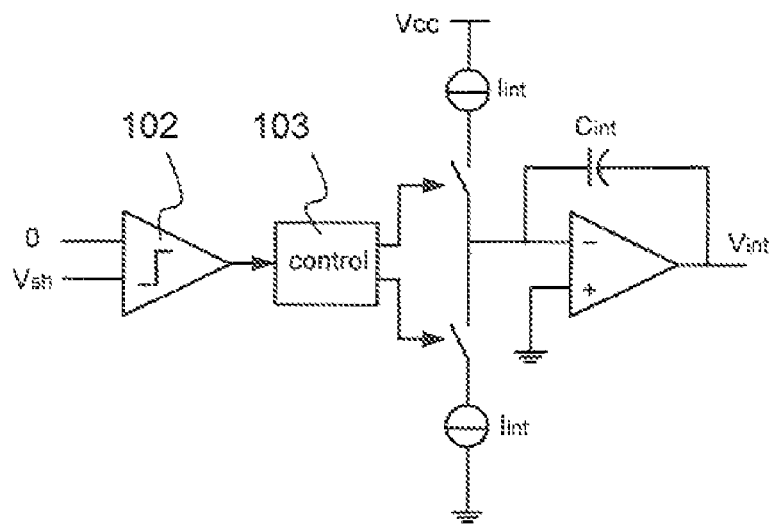
*Fig. 10(a)*
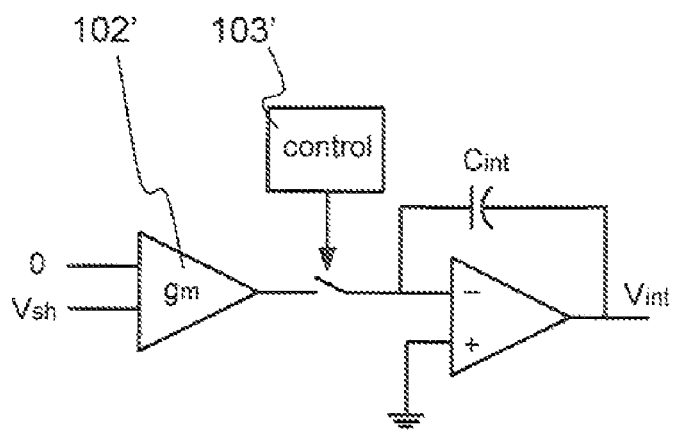
*Fig. 10(b)*
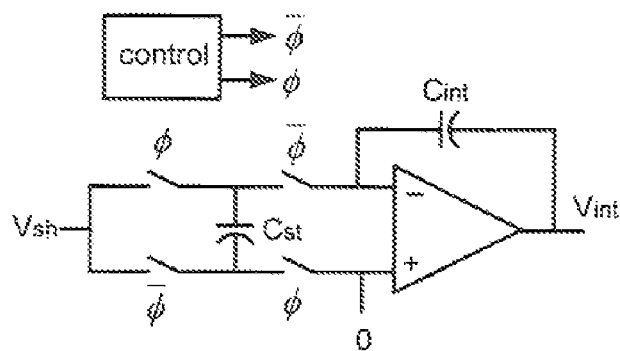
*Fig. 10(c)*
Fig. 10

SELF-OSCILLATING SWITCHED MODE CONVERTER WITH VALLEY DETECTION

FIELD OF THE INVENTION

This invention relates to energy converters, and is particularly relevant to switched mode energy converters and resonant converters. Examples of such converters include self-oscillation mode boost converters and buck converters.

BACKGROUND OF THE INVENTION

Operation of switched mode or resonant energy converters in self-oscillation mode is of general, and increasing, interest due to the relatively low power loss of this mode of operation. In this mode, the timing of the switch or switches is controlled not by an external timer or clock, but by a resonant characteristic of the circuit itself. For efficient operation of the device, it must be able to sense the maxima and minima, or peaks and valleys, in an appropriate characteristic such as an output current or an inductor current.

For self-oscillation mode, an effective valley-detection circuit is important to ensure a low power loss. Known valley-detection circuits usually have direct valley detection; that is to say, the circuit detects a minimum—which corresponds to the bottom of a valley—in the signal. Such circuits include TEA1750 and TEA1507 from NXP Semiconductor's Greenchip families. However, direct detection is non-ideal as will be discussed below. Furthermore, there is a trend towards higher conversion frequencies; a conversion frequency of 1 MHz can result in a ringing frequency of up to 4 MHz. At these frequencies the disadvantages of direct detection become more significant. The increasing commercial and technical drive towards higher frequencies is due in part to the fact that this enables smaller and cheaper passive components such as inductors and capacitors, as well as other advantages for particular applications such as better colour stability and increased dimming range for lighting applications.

In direct detection circuits the level of ringing is measured without any error feedback. An example of a direct detection circuit for an energy converter is given in International Patent Application Publication WO01/78467A1.

An exemplary self-oscillation boost mode converter incorporating direct detection is shown in FIG. 1, and the relevant voltages and currents are shown in FIG. 2. FIG. 1 shows switch 1, the source of which is connected to sense resistor 2 that is used to sense inductor current, and define the maximum coil current. Inductor 3 is in series with capacitor 4 and forms a resonant tank with the capacitor 4. The converter has a primary stroke during which the switch 1 is turned on and current through the inductor increases. Upon detection of a set peak current value Ipeak through the inductor 3, the switch 1 is turned off. Thereafter the diode 5 is conducting, and the inductor discharges through diode 5 to the output. On detection of minimum drain voltage during ringing period Tr, the switch 1 is turned on again to restart the cycle Detection of the peak inductor current Ipeak can be implemented in various ways. The example shown in FIG. 1 includes the sense resistor (Rs) 2 in series with the source of the switch 1. Consequently Ipeak is determined from Vpeak/Rs. Alternatively, peak current detection can be implemented with a sense resistor in series with inductor 3.

A common implementation of zero current (Izero) detection is to detect the voltage valley on the switch node 6, that is, the drain of the switch. This utilises the resonant tank of the inductor 3 along with capacitance 4 present on the switch node. An advantage of this detection method is that switching losses and electromagnetic interference are minimised because the voltage on the inductor will be softly reversed and the switch will turn on when the switch node voltage achieves a minimum or valley.

The turn on moment of the switch 1 is based on direct valley detection: the ringing in the resonant tank is converted into a resonant current (Is) through a capacitor (Cs) 7. The current Is is mirrored in current mirror 9, and the level of the mirrored resonant current is evaluated during every conversion cycle by a current comparator 8 which comprises current sources Ic (8') and a buffer stage 8". Combined with some logic control 10 the comparator output is used to turn on the switch through driver 11.

For such a direct detection method, the accuracy is limited by
1. delay of the driver: the driver is used to drive the converter switch, and its delay will be directly added to any phase error;
2. delay of the comparator 8: the delay of the comparator will also be added to the phase error.

Thus, valley detection based on direct detection is inherently inaccurate. For low frequency operation of a converter, this in-accuracy may be acceptable. However, for higher ringing frequencies of up to and around 4 MHz, the phase error ($\Delta T$/Tring in FIG. 3) becomes significant and can give rise to a considerable loss of power. Furthermore, due to process spread and temperature variation, both the amplitude and the frequency of the ringing will spread. This will give rise to a spread in the phase error.

As a result of these errors the practical timing diagram for a circuit such as FIG. 1 is as shown in FIG. 3, which may be compared with the ideal timing diagram shown in FIG. 2.

FIG. 2 shows the current $I_L$ through the inductor 3, the non-zero part of the current $I_D$ through the diode 5, and the voltage Vdrain at the switch node 6 for ideal operation of the boost converter of FIG. 1. During the primary stroke T1 the inductor current rises until it reaches a peak value Ipeak. At this point the switch 1 is turned off and the drain voltage (Vdrain) start to rise. After a time Tg the drain voltage achieves the output voltage (Vout). Neglecting the small voltage drop across diode 5, at this point the diode 5 starts to conduct. As the inductor 3 discharges through the diode 5 the inductor current and diode current will fall. When the inductor current crosses zero the drain voltage (Vdrain) will start to fall. This is the end of the discharge period T2, and the start of a ringing period Tr. In the ideal situation depicted in FIG. 2 the end of the period Tr occurs when the drain voltage (Vdrain) reaches a minimum value, which is determined solely by the resonant frequency of the resonant tank formed from the inductor 3 and capacitance at switch node 6. For this to be the case, the ringing period Tr would last for half the resonant cycle time of the resonant tank; that is to say, Tr=Tring/2. At this moment, in the ideal case shown, the switch 1 is switched on and the drain voltage immediately falls to zero.

However, for a practical device, as shown in FIG. 3, the period Tr is likely to be longer than half the resonant cycle time of the resonant tank (which is shown in the diagram as Tring/2) by reason of the errors discussed above. In FIG. 3 the difference between the period Tr and half the resonant cycle time of the resonant tank (Tring/2) is shown as the period $\Delta T$. During this period $\Delta T$ the drain voltage is rising due to the oscillation of the resonant tank, and the inductor current is rising above zero. Thus when the switch 1 is turned on, there is a an extra loss associated with the non-minimum drain voltage of the switch 1.

An alternative method of realising a valley detection circuit is disclosed in WO01/78467, and illustrated in FIG. 4. In this disclosure the ringing is converted into a resonant current (Is) through the capacitor (Cs), and the peak of the resonant current (Is) is detected in peak current detector 41. Then, the threshold value of the current comparator is derived by multiplying the peak value of Is with a constant K, where K has a value between zero and 1. Using adaptive feed forward control comprising comparator 43, the delay due to the comparator and driver 44 can be compensated by carefully adjusting the value of K in the design. However, the accuracy of this valley-detection circuit will be sensitive to the spread of the ringing frequency and the spread of the comparator and driver delay.

The ideal timing circuit for a feed-forward control circuit such as that of FIG. 4 is shown in FIG. 5, which shows the inductor current, $I_L$, the scaled peak value (Isp) of Is, that is Kx Isp, and the drain voltage Vdrain.

There is thus a continued need for an energy converter which has an improved valley detection control mechanism.

SUMMARY OF THE INVENTION

It is an object of the present invention to provide an energy converter with an improved mechanism for valley detection.

According to the invention there is provided an energy converter, comprising a switch having a gate and a source and a drain connected to a switch node, an inductor connected between a voltage terminal and the drain and having an associated inductor current, the drain having an associated drain voltage, a driver for providing a drive signal to the gate, and a controller for controlling the driver, the switch being operable by the controller to conduct current between the drain and source during each of a plurality of primary strokes, the controller comprising reference-fixing means for determining a moment Tref which precedes a moment when the drain voltage next has a local minimum by a constant time interval ΔF, the controller being adapted to switch on the switch to commence the (n)th primary stroke at the end of an interval ΔT(n), which interval starts at the moment Tref, and determining means for determining ΔT(n+1) in dependence on ΔT(n) and the drain voltage at the start of (n)th primary stroke.

Preferably the determining means determines ΔT(n+1) in dependence on the drain voltage at the start of the (n)th primary stroke by means of an error signal. More preferably the error signal is derivable from the drain voltage by means of a differentiator and a sample-and-hold stage, which sample-and-hold stage is adapted to sample the output from the differentiator at the start of the primary stroke. More preferably still, the error signal is processed by integration means to provide an input to a voltage-to-time converter. This provides a particularly convenient way of determining ΔT(n+1).

Advantageously, the voltage-to-time converter may be adapted to start a voltage-to-time conversion the moment Tref, and still more advantageously, the switched mode energy converter may further comprise peak detection means for determining a start of a ringing of the drain voltage.

Preferably the reference fixing means determines Tref in dependence on a start of the ringing of the drain voltage, and more preferably still, Tref corresponds to a start of a ringing of the drain voltage. This is a particularly convenient choice of a moment for Tref since Tring/2 is independent of external circuit conditions.

Preferably the switched mode energy converter further comprises a direct valley detection means for determining a minimum in the drain voltage, and more preferably still, the controller is adapted to switch on a switch to commence the (n)th primary stroke at the earlier of (a) the end of an interval ΔT(n), which interval starts at the moment Tref, and (b) the moment the direct valley detection means determines a minimum in the drain voltage. Thus the switched mode energy converter may avoid multiple ringing of the resonant tank. Also the controller can be adapted to make the multiple ringing appear and switch 1 turn on when the drain voltage achieves minimum after the first ring cycle.

Preferably a predetermined error Vx is multiplied with the error signal.

Preferably the integration means comprises an integrator adapted to be charged by a constant current source if the error signal is greater than a predetermined value (Vref) and to be discharged by the constant current source if the error signal is equal to or less than the predetermined value, or vice versa. Alternatively, the integration means may comprise an integrator adapted to be charged or discharged by a current source which is proportional to the error signal. In a further alternative, the integration means may comprise a switched-capacitor integrator. These means each provide particularly convenient ways of implementing the integrator.

Preferably, the voltage-to-time converter comprises a capacitor, a switch, and a comparator having a first input and a second input, the capacitor being adapted to be charged by a constant current source and connected to the first input of the comparator, the input to the voltage-to-time converter being connected to the second input of the comparator, and the switch being connected across the capacitor and arranged to discharge the capacitor between conversions. This provides a particularly convenient implementation having a small footprint and low component count.

Alternatively, the voltage-to-time converter comprises a voltage-to-current converter, a capacitor, switch, and a comparator having a first comparator input and a second comparator input connectable to a reference voltage, the input to the voltage-to-time converter being connected to the input of the voltage-to-current converter, the output of which is connected to both the capacitor and the first comparator input, and the switch being connected across the capacitor and arranged to discharge the capacitor between conversions.

Beneficially, the switched mode energy converter may comprise a boost converter and the voltage terminal may be a voltage input. Alternatively, the switched mode energy converter may comprise a buck converter and the voltage terminal may be a voltage output. These types of energy converters are particularly suited to the current invention, but the invention is not limited to them.

According to another aspect of the present invention, there is provided a method of controlling a switched-mode energy converter comprising a switch having a gate and a source and a drain connected to a switch node, an inductor connected between a voltage terminal and the drain and having an associated inductor current, the drain having an associated drain voltage (Vdrain), a driver for providing a drive signal to the gate, and a controller for controlling the driver, the switch being operable by the controller to conduct current between the drain and source during each of a plurality of primary strokes, the method comprising the steps of
(a) determining a moment Tref which precedes a moment when the drain voltage next has a local minimum by a constant time interval ΔF,
(b) switching on the switch to commence the (n)th primary stroke at the end of an interval ΔT(n), which interval starts at the moment Tref; and
(c) determining ΔT(n+1) in dependence on ΔT(n) and the drain voltage at the start of the n(th) primary stroke.

Preferably, step (c) comprises determining ΔT(n+1) in dependence on the drain voltage at the start of the (n)th primary stroke by means of an error signal, and further comprising the step of deriving the error signal from the drain voltage by differentiating the drain voltage, and sampling the differentiated drain voltage at the start of the primary stroke.

Advantageously, the method may include the steps of processing the error signal by integration and converting the resulting integral to a time.

Preferably, the method includes the steps of detecting a start of a ringing of the drain voltage and starting a voltage-to-time conversion at the start of the ringing of the drain voltage.

Advantageously, step (a) may comprise determining Tref as the start of a ringing of the drain voltage.

Preferably, the method further comprises detecting a minimum in the drain voltage by direct valley detection means.

Advantageously, the controller may switch on the switch to commence the (n)th primary stroke at the earlier of (a) the end of an interval $\Delta T(n)$, which interval starts at the moment Tref, and (b) the moment the direct valley detection means determines a minimum in the drain voltage.

Preferably, the method comprises the step of multiplexing a predetermined error Vx with the error signal.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which

FIG. 10(a)-(c) shows three alternative implementations of the function block z/(z−1) of FIG. 9;

Figure 1:
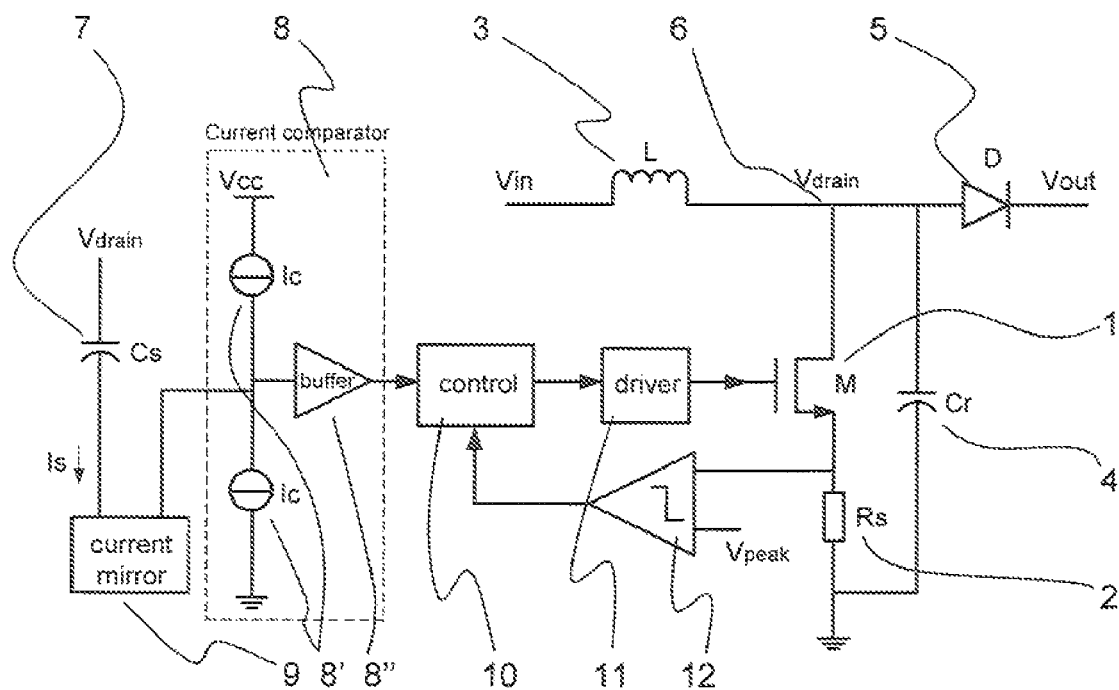
FIG. 1 shows a prior art boost converter with direct valley detection.
Figure 2:
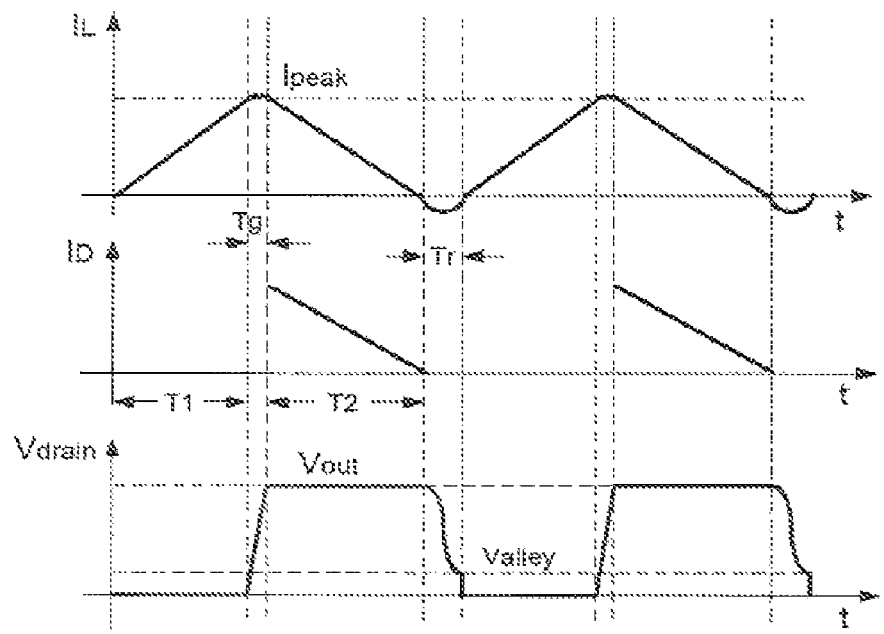
FIG. 2 shows the ideal timing diagram of the boost converter of FIG. 1.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 6:
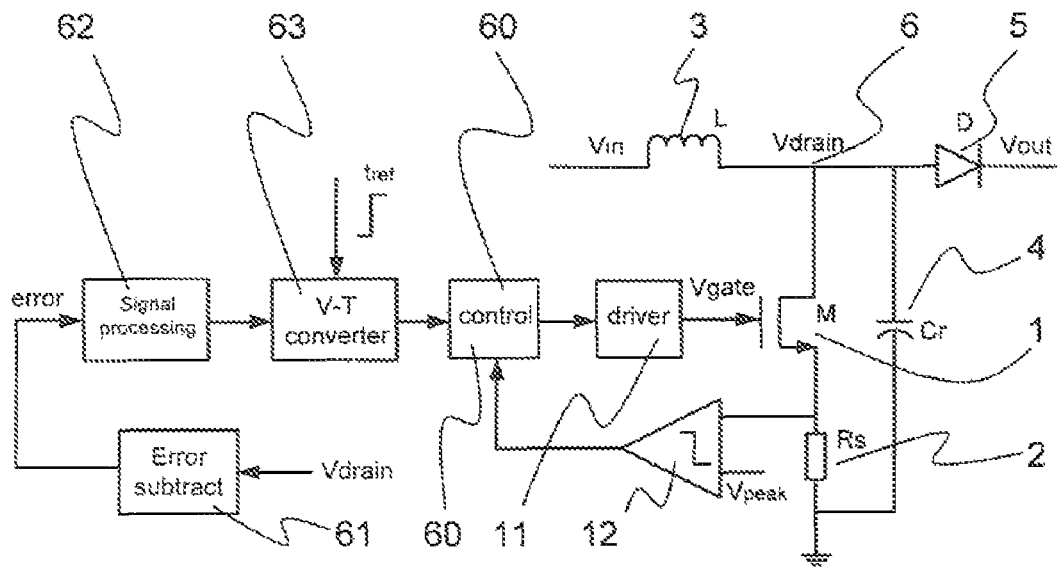
FIG. 6 illustrates a boost converter having a closed loop valley detection control means according to an aspect of the present invention, along with the associated drain voltage diagram.
Figure 6:
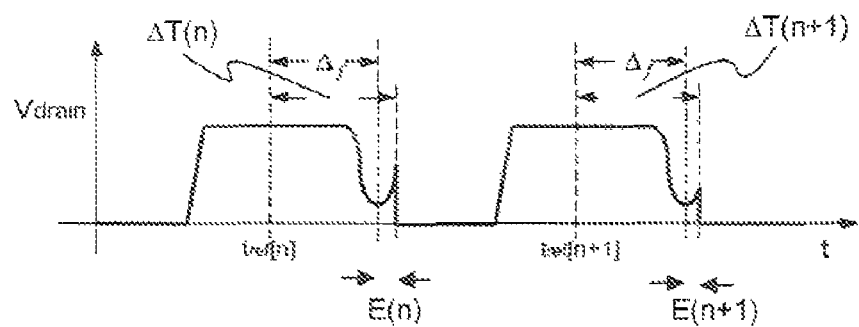

An embodiment of the invention comprising a boost converter is shown in FIG. 6. In overview, the switching error is measured at the moment when the switching device is turned on, and then the switching error is fed back to adjust the switch-on moment of the next cycle.

FIG. 6 shows a boost converter which, apart from the control, is similar to prior art converters. Thus it has a switch 1, the source of which is connected to sense resistor 2 that is used to sense inductor current, and define the maximum coil current. The drain of the switch forms switch node 6, which is connected to a voltage input (Vin) by inductor 3. The switch node 6 is connected to ground via capacitor 4, such that inductor 3 and capacitor 4 form a resonant tank. The switch node 6 is connected to the output voltage (Vout) by means of diode 4. The switch is driven by means of driver 11, under control of control logic 60.

As shown on the plot of drain voltage (Vdrain), a fixed reference moment Tref which is a fixed time $\Delta F$ before the real valley in the drain voltage, is chosen. Tref is chosen such that $\Delta F$ is the same for each conversion cycle: that is to say, Tref(n) has the same relationship in time to the valley of the (n)th conversion cycle as does Tref(n+1) to the valley of the (n+1)th conversion cycle. The switching moment on the (n)th cycle occurs at the end of a period $\Delta T(n)$ after Tref(n). The difference between $\Delta T(n)$ and $\Delta F$ represents a switching error E(n) for the (n)th cycle. The target for the controller is to ensure that the absolute value of the (n+1)th error E(n+1) is less than the (n)th error E(n), and ultimately to reduce the error E to zero.

Figure 3:
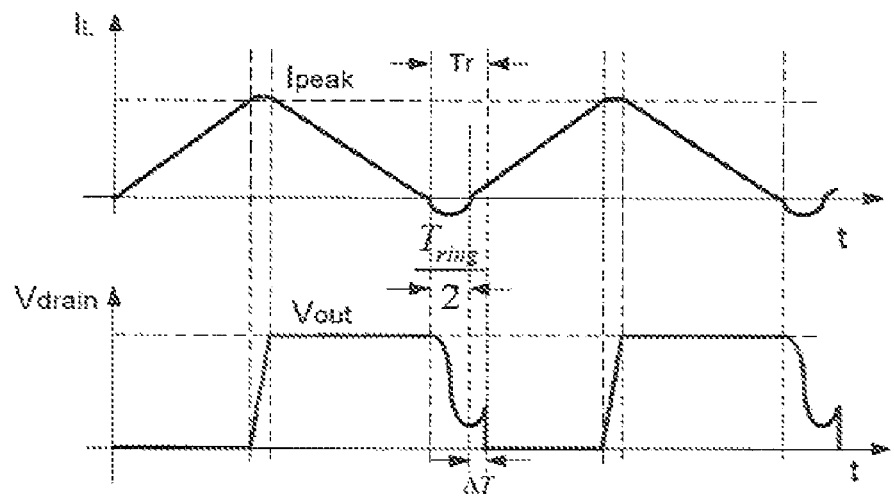
FIG. 3 shows a practical timing diagram of the boost converter of FIG. 1.
Figure 4:
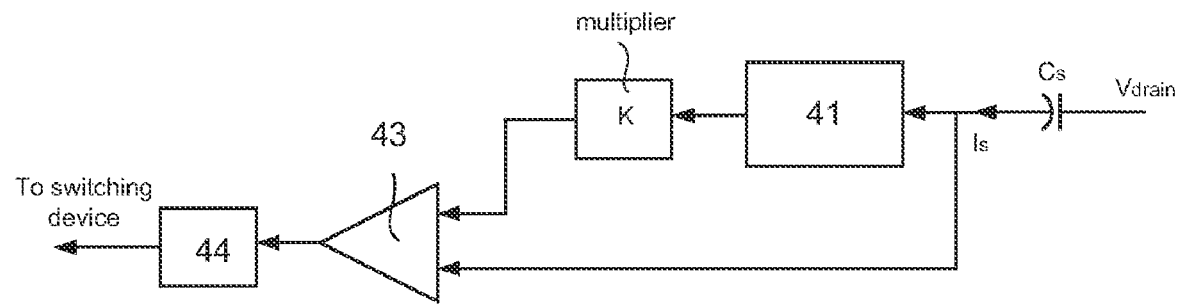
FIG. 4 illustrates an alternative prior art valley detection circuit, having adaptive feed forward control.
Figure 5:
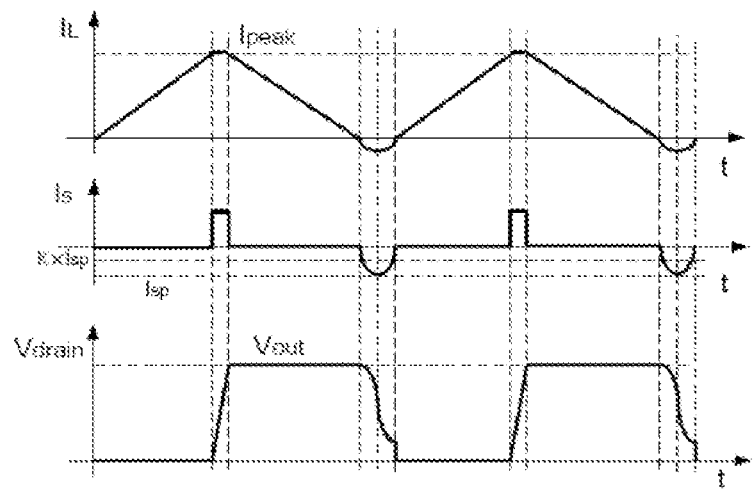
FIG. 5 shows the timing diagram of the valley detection circuit shown in FIG. 4.

In principal, the most suitable location of the reference time Tref should be the first peak of ringing, that is the starting point of the ringing. As shown in FIG. 3, this corresponds in principal to the moment at which the drain voltage starts to fall. However, it should be noted that there may be some settling to the drain voltage due to parasitic effects, and to this extent the flat section to the drain voltage at a level Vout is to some extent idealised.

An effective way to realise the error subtraction is by differentiating the drain voltage, and then sampling the differentiated signal when the switch 1 is turned on. In the ideal situation the differential of the drain voltage will be zero. That is because at the bottom of the valley, the drain voltage will be a minimum and thus its differential is zero. If the differential of the drain voltage at the moment of switching is positive, it indicates that switching moment was later than the valley and will be earlier next conversion cycle. Inversely, if the differential of the drain voltage at the moment of switching is negative, it indicates that switching moment was earlier than the valley and will be later next conversion cycle. Thus, the polarity of the differential, at the moment of switching, provides an indication that the system is earlier or later than the ideal switching moment. Further, if the switching moment is close to the ideal switching moment. The larger absolute value of the differential of the drain voltage at the moment of switching the further in time is the switching occurring from the valley: thus the magnitude of the differential, at the moment of switching, provides an indication of how far, in time, the system is from the ideal switching moment.

The simplest signal processing 62 for the error signal is integration (z/(z−1)).

Figure 7:
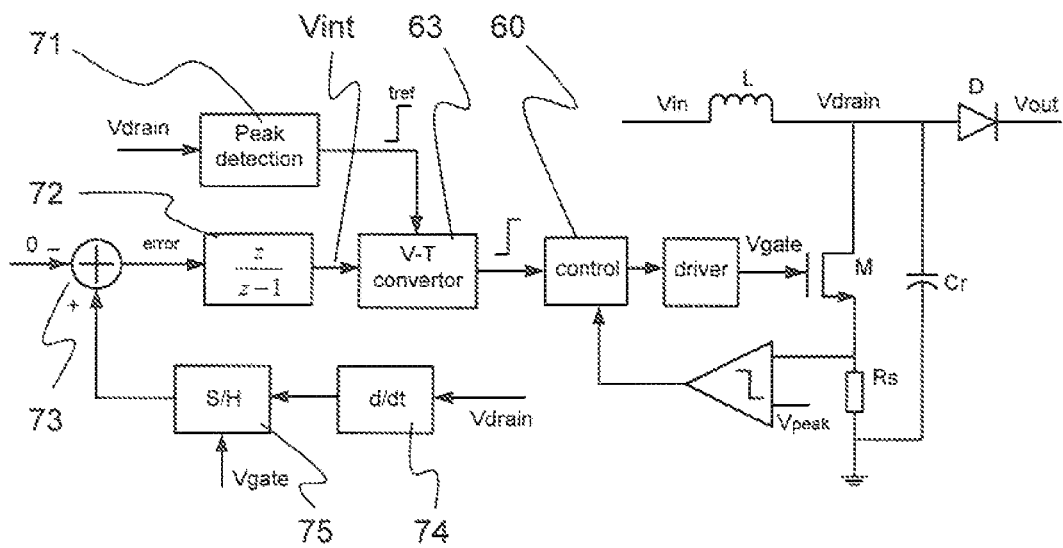
FIG. 7 shows the embodiment of FIG. 6 in more detail.

FIG. 7 shows the system diagram for the control in more detail.

First, the phase of the ringing is shifted by 90 degree by a differentiator 74 (d/dt), whose output is given by:

$$V_d(t) = k_d \frac{dV_{drain}}{dt}$$

where $k_d$ is a constant, which is given by the differentiator. Then the output of the differentiator is sampled by a sample and hold circuit 75 (S/H), whose output is given by:

$$V_{sh}(t) = V_d(t_s[n])$$

where $t_s[n]$ stands for the switch-on moment of a certain conversion cycle. Then, an error voltage that is related to the switching error E(n) is subtracted (73):

$$V_{error}[n] = V_{sh}(t) = V_d(t_s[n])$$

Then the integrator 72 output can be expressed as:

$$V_{int}[n+1] = V_{int}[n] + \frac{1}{\tau} \int_0^{T_0} V_{error}[n] \, dt = V_{int}[n] + k_i V_{error}[n]$$

Where $T_0$ is a fixed time interval and $k_i$ is a constant. Then, a voltage-to-time converter (V-T converter) will generate a delay time $\Delta T_{con}$, which is a function of Vint and can be expressed as:

$$\Delta T_{con}[n+1] = f(V_{int}[n+1])$$

The moment corresponding to the first peak of the ringing is used as a reference moment tref. Then, the moment when the switching device M is turned on can be expressed as:

$$t_s[n+1] = t_{ref}[n+1] + \Delta T_{con}[n+1] + \Delta T_{dr}$$

where $\Delta T_{dr}$ is the delay caused by the driver and control logic. Therefore, the loop will adjust the switch-on moment by tuning the delay ΔTcon until the switching error E equals to zero.

Figure 8:
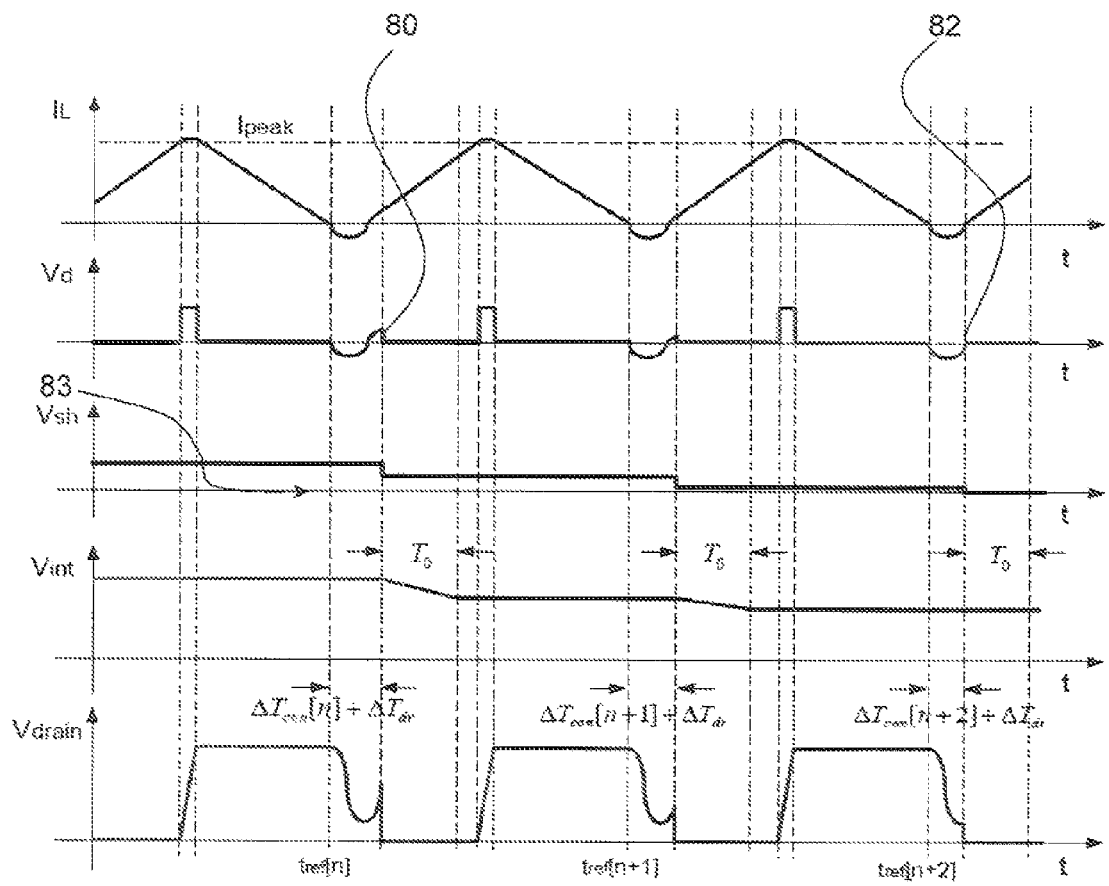
FIG. 8 shows the timing diagram of the embodiment shown in FIG. 7.

The timing diagram corresponding to the system diagram FIG. 7 is shown in FIG. 8. This shows the inductor current (IL), the differentiator output (Vd), the sample-and-hold output voltage (Vsh), the integrator output (Vint), and the drain voltage (Vdrain). The timing diagram shows that the error E(n) reduces over the (n)th, (n+1)th and the (n+2)th cycles.

FIG. 8 illustrates that the differentiator output ($V_d$) at the end of the ringing period Tr reduces from the (n)th to the (n+2)th cycle as shown at points 80 and 82 respectfully. The corresponding sample and hold output voltage (Vsh) reduces and finally approximates to zero. The integrator output similarly tends to a constant level 83, at which time the switch is switched off at the bottom of the valley.

This is the ideal state, and the system will retain this state unless there are changes or perturbations to the external circuit; the effects of a perturbation will be to move the switching point away from the bottom of the valley, and the circuit will then operate over the next few cycles to return the switching point to the ideal moment.

Figure 9:
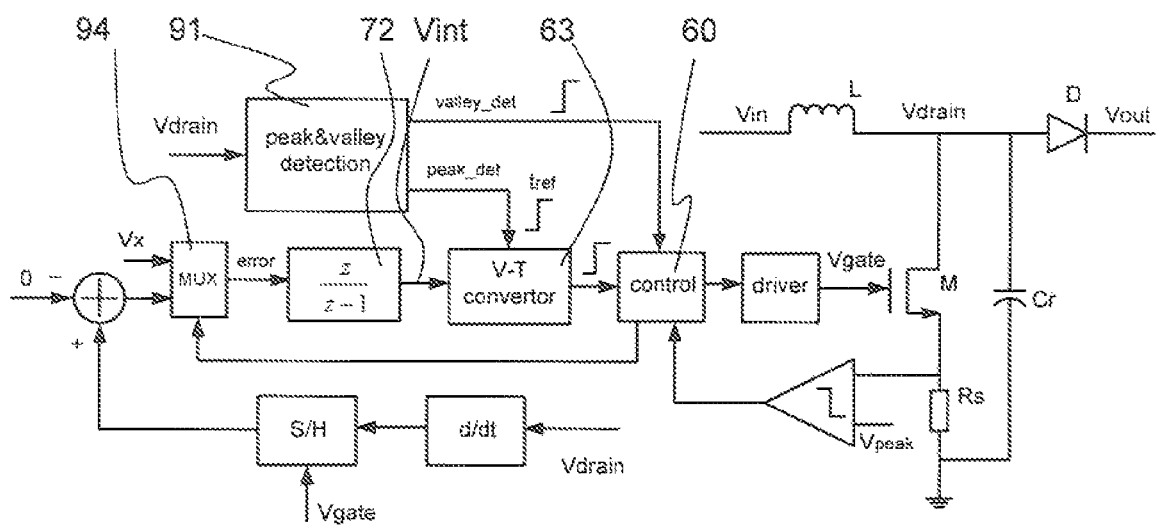
FIG. 9 shows in more detail still the system diagram for the embodiment of FIG. 6.

If the delay $\Delta T_{con}(n) + \Delta T_{dr}$ is larger than one ringing cycle, it would not be possible to turn on the switch 1 at the first valley. To overcome this problem, in a further embodiment of the invention, the first valley is also direct detected by the peak detection circuit. This peak detection circuit is similar to the known valley detection circuit shown in FIG. 1. The resulting system diagram is shown in FIG. 9. In this circuit the peak detection 91—which also has the function of valley detection is used both to trigger the start of the voltage-to-time converter 63 and as a direct input to the logic control 60. When the calculated switch on moment as determined by the voltage-to-time converter is later than that as determined by the peak detection circuit, the actual switch on moment—which is chosen to be the earlier of the two—will be determined by the peak detection circuit. In this case, a fixed error Vx is chosen as the error voltage, as shown in the multiplexing stage 94, which ensures a smaller $\Delta T_{con}$ for the next cycle. As a result, after several cycles, the switch on moment given by the voltage-to-time converter will be earlier than that given by the peak detection circuit.

Consequently the switch on moment as determined in this embodiment can be written as:

$$t_s[n+1] = \begin{cases} t_{ref}[n+1] + \Delta T_{con}[n+1] + \Delta T_{dr} & \Delta T_{con}[n+1] \le \Delta T_{pv} \\ t_{ref}[n+1] + \Delta T_{pv} + \Delta T_{dr} & \Delta T_{con}[n+1] > \Delta T_{pv} \end{cases}$$

In this equation $\Delta T_{pv}$ is the time interval between the start of the ringing and the moment when the peak detection circuit detects the valley. Using such an embodiment a high accuracy of valley detection, with a phase error ΔT/Tring of less than 2.7%, has been found to be achievable even with a ringing frequency of up to 4 MHz.

It is to be remarked that, due to the error feedback, the process dependent delay of both the peak detection and the driver does not give rise to any error in this embodiment. Also, in situations where the phase error of the differentiator is negligible, the accuracy of the embodiment is not dependent on the spread of the ringing frequency. In effect and to a first approximation the final accuracy of the embodiment is determined only by the phase error caused by the differentiator.

For proper implementation of this particular embodiment the delay of the driver, $\Delta T_{dr}$ should be smaller than half the ringing cycle. This then determines the maximum ringing frequency of this embodiment. However, by use of additional circuitry to provide a negative offset to Tref for the (n+1)th cycle, a larger delay $\Delta T_{dr}$ may be accommodated with only a small loss of performance.

In a further embodiment (not shown), a system similar to that of FIG. 9 but including additional control, can be used to precisely detect later valleys such as the second or third valley in the ringing.

In a yet further embodiment (also not shown), a DC offset may be added in the loop for specific implementation.

The integration block 72 along with error subtraction 73 may be implemented in a variety of ways. Examples are shown in FIG. 10(a)-(c).

FIG. 10(a) shows an example of an integrator which is either charged or discharged by a constant current $I_{int}$, the polarity of which is determined by the sign of $V_{error}$. Thus the comparator 102 determines whether Vsh (which is equivalent to the error voltage $V_{error}$) is positive or negative, and the control 103 thereby determines the direction of the constant current flow $I_{int}$. The capacitor $C_{int}$ is used as the integrator.

In an alternative implementation shown in FIG. 10(b), the integrator is either charged or discharged by a current source, which current source is proportional to $V_{error}$. In this implementation 102' represents a voltage-to-current converter, to provide a current which may be positive or negative. Once again the integration is effective over the capacitor Cint under control of the control block 103'. The controller 103' is adapted to make the integration occurs for the same constant time interval, on each cycle.

In the implementation of FIG. 10(c) a switched-capacitor integrator is used instead of a continuous-time integrator. The phase φ and $\bar{φ}$ correspond to opposite polarities of $V_{error}$ applied to the capacitor $C_{st}$. As a result the corresponding difference of the charge will be transferred to the integration capacitor $C_{int}$.

Figure 11A:
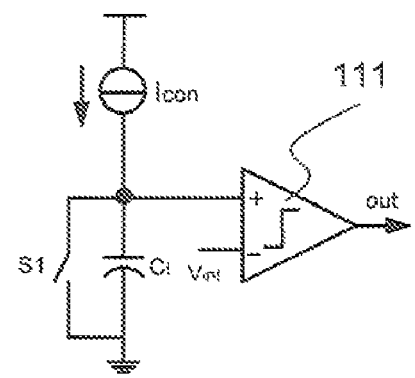
FIGS. 11(a) and (b) show examples of voltage-to-time converters.

Similar to implementations of the function block z/(z−1) with error subtraction, various forms of which are well known to those skilled in the art, it will be immediately apparent to the skilled person how to implement a voltage-to-time converter. However, for completeness an example of such a voltage-to-time converter is shown in FIG. 11a. In each cycle, when the inductor 3 current ($I_L$) achieves a maximum (Ipeak) the switch S1 is closed to completely discharge the capacitor Ct. Then at the moment $T_{ref}$, the switch S1 is opened and Ct is charged by a constant current Icon. When the voltage across Ct reaches $V_{int}$, the comparator 111 turns on to get a positive output (out) driver will begin to turn on the switch 1. As a result, the function between $\Delta T_{con}$ and $V_{int}$ can be expressed as:

$$\Delta T_{con}[n+1] = f(V_{int}[n+1]) = \frac{C_t V_{int}[n+1]}{I_{con}}$$

Figure 11B:
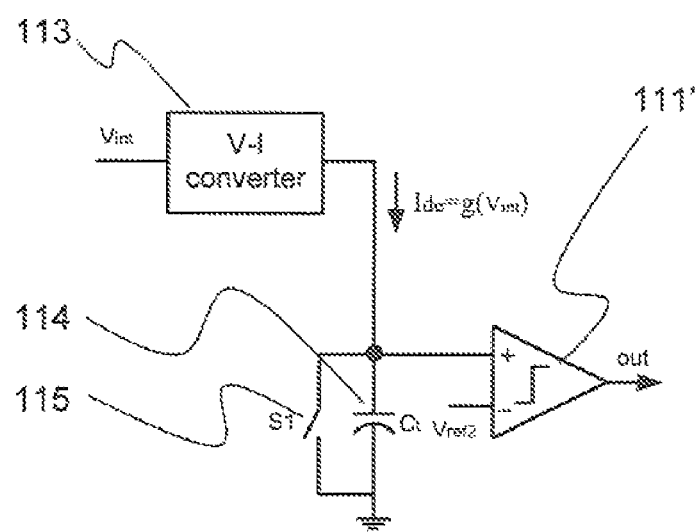

An alternative embodiment of a voltage-to-time converter, which is particularly suited to the invention is shown in FIG. 11b. In this voltage-to-time converter, the input voltage is converted into a voltage dependent current by a voltage-to-current converter (V-I converter, 113). That current is used to charge the capacitor 114. The capacitor is connected to one input of the comparator 111'. Another input of the comparator is connected to a predetermined value Vref2. Also, the switch 115 being connected across the capacitor is arranged to discharge the capacitor between conversions. This part of the arrangement is the same as that for FIG. 11a. Finally, the function between $\Delta T_{con}$ and $V_{int}$ can be expressed as:

$$\Delta T_{con}[n+1] = f(V_{int}[n+1]) = \frac{C_t V_{ref2}}{I_{de}} = \frac{C_t V_{ref2}}{g(V_{int}[n+1])}$$

Figure 13:
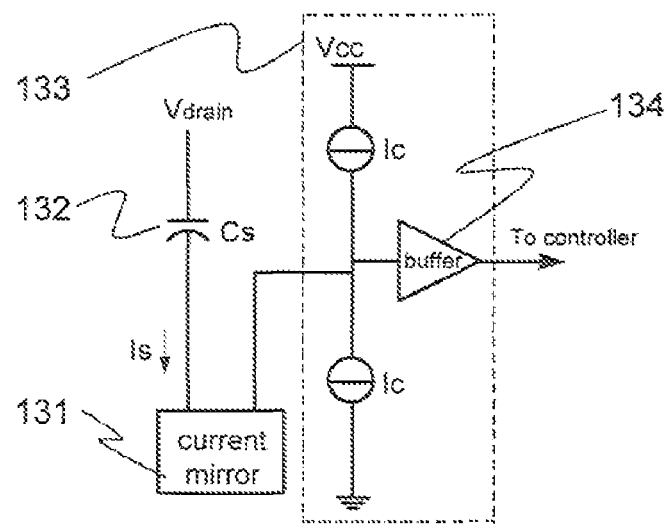
FIG. 13 shows an example of a peak detection circuit.

A particular implementation of the peak detection and direct valley detection circuit is shown in FIG. 13. The ringing of the drain voltage is first converted into a resonant current by a capacitor 132. The resonant current is mirrored by a current mirror 131, and then flow into the current comparator 133 which comprise two current source and a buffer. This implementation can be used for both peak detection and direct valley detection.

Note that the peak detection function block show in FIGS. 7 and 9 (71 and 91 respectively) carries out the detection of the peak of the ringing of the drain voltage. In those instances, the start of the ringing is the first peak of the ringing, but not the only peak of the ringing if multiple ringing appears. However, despite if multiple ringing appears, as the first peak of the ringing, the start of the ringing will be always detected.

The circuit of FIG. 13 can be utilised for peak detection as follows: when the peak of the ringing is detected, the buffer 134 will output a trigger signal to the controller. If the detected peak is the start of the ringing, the controller will then trigger the voltage-to-time converter to start the voltage-to-time conversion.

Further, the circuit can be utilised for direct valley detection as follows: when the valley of the ringing is detected, the buffer will output a trigger signal to the controller. Then, the controller will start the driver to make the switch turn on, if we would like to avoid multiple ringing.

It is to be noted that if the controller is adapted, the peak detection and the direct valley detection can share one circuit as shown in FIG. 13. In this case, the peak detection and the direct valley detection will correspond to opposite polarity of the trigger signal. Further, by the combination of the peak detection, direct valley detection and the valley detection based on the error feedback loop, the controller can be adapted to make the switch turn on at any desired valleys (first, second, third, . . . ).

The embodiments described above have related to boost converters. However the invention is equally applicable to other kinds of converters that work in self-oscillation mode. In particular, this includes buck converters and flyback converters. An example of an embodiment of the invention implemented as a buck converter is shown in FIG. 12.

Figure 12:
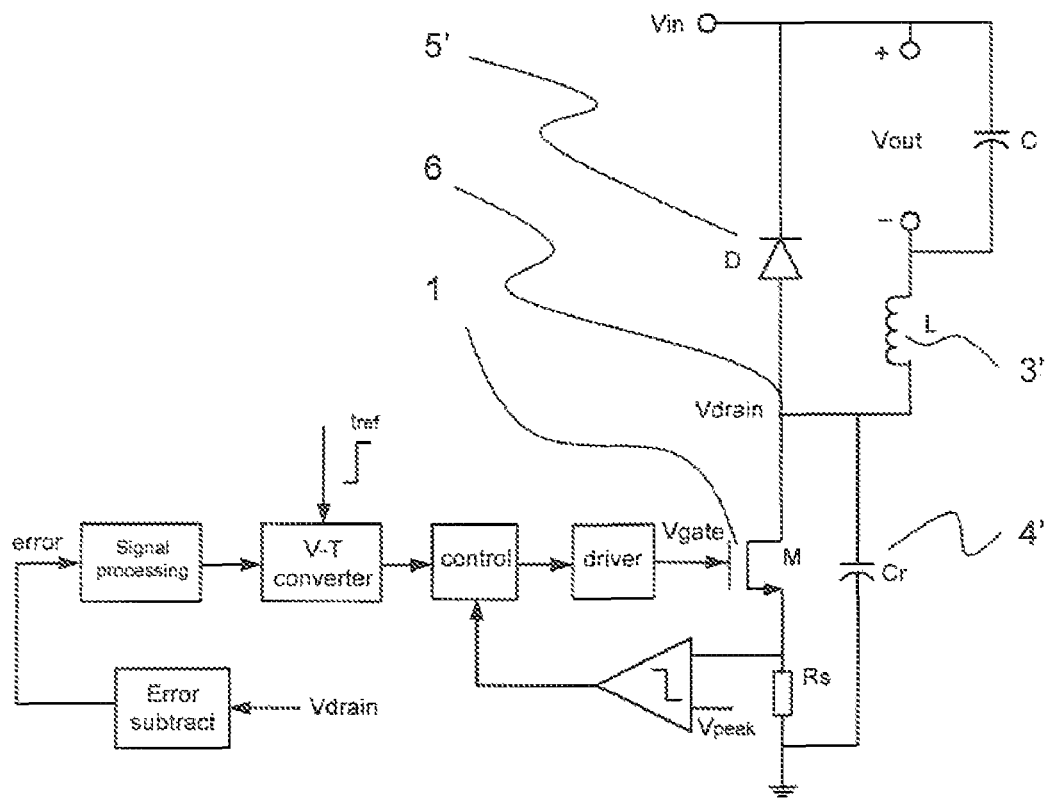
FIG. 12 shows an example of a buck converter according to another embodiment of the invention.

The buck converter circuit of FIG. 12 is similar to the boost converter of FIG. 1, except that in the case of the buck converter the inductor 3' is between the switch node 6 and the voltage output (Vout). (The capacitor 4' which forms part of the resonant tank along with inductor 3' is completely independent of the smoothing capacitor C on the output voltage.) The diode 5' is in this case between the switch node 6 and input voltage (Vin). In practice, for either boost or buck converters, the smoothing capacitor directly connected to the output is not necessary, but is found to be helpful for the performance. Further, in a boost converter according to the invention, a further capacitor may usefully be provided at the output. The driver and control of this embodiment operate in directly analogous fashion to that described with respect to the first embodiment of the invention.

From reading the present disclosure, other variations and modifications will be apparent to the skilled person. Such variations and modifications may involve equivalent and other features which are already known in the art of resonant or switched mode energy converters, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfill the functions of several means recited in the claims and reference signs in the claims shall not be construed as limiting the scope of the claims.

The invention claimed is:
1. An energy converter comprising
a switch having a gate and a source and a drain connected to a switch node, an inductor connected between a voltage terminal and the drain and having an associated inductor current, the drain having an associated drain voltage, a driver for providing a drive signal to the gate, and a controller for controlling the driver, the switch being operable by the controller to conduct current between the drain and source during each of a plurality of primary strokes, the controller comprising reference-fixing means for determining a moment Tref which precedes a moment when the drain voltage next has a local minimum by a constant time interval $\Delta F$, the controller being adapted to switch on the switch to commence the (n)th primary stroke at the end of an interval $\Delta T(n)$, which interval starts at the moment Tref, and determining means for determining $\Delta T(n+1)$ in dependence on $\Delta T(n)$ and the drain voltage at the start of (n)th primary stroke.

2. An energy converter as claimed in claim 1, wherein the determining means determines $\Delta T(n+1)$ in dependence on the drain voltage at the start of the (n)th primary stroke by means of an error signal.

3. An energy converter as claimed in claim 2, wherein the error signal is derivable from the drain voltage by means of a differentiator and a sample-and-hold stage, which sample-and-hold stage is adapted to sample the output from the differentiator at the start of the primary stroke.

4. An energy converter as claimed in claim 2, wherein the error signal is processed by integration means to provide an input to a voltage-to-time converter.

5. An energy converter as claimed in claim 4 wherein the voltage-to-time converter is adapted to start a voltage-to-time conversion at Tref.

6. An energy converter as claimed in claim 4, further comprising peak detection means for determining a start of a ringing of the drain voltage.

7. An energy converter as claimed in claim 1, wherein the reference-fixing means determines Tref in dependence on a start of a ringing of the drain voltage.

8. An energy converter as claimed in claim 7, wherein Tref corresponds to a start of a ringing of the drain voltage.

9. An energy converter as claimed in claim 2, further comprising a direct valley detection means for determining a minimum in the drain voltage.

10. An energy converter as claimed in claim 9, wherein the controller is adapted to switch on the switch to commence the (n)th primary stroke at the earlier of (a) the end of an interval $\Delta T(n)$, which interval starts at the moment Tref, and (b) the moment the direct valley detection means determines a minimum in the drain voltage.

11. An energy converter as claimed in claim 10, wherein a predetermined error Vx is multiplexed with the error signal.

12. An energy converter as claimed in claim 4, wherein the integration means comprises an integrator either adapted to be charged by a constant current source if the error signal is greater than a predetermined value and to be discharged by the constant current source if the error signal is equal to or less than the predetermined value or adapted to be discharged by the constant current source if the error signal is greater than the predetermined value and to be charged by the constant current source if the error signal is equal to or less than the predetermined value.

13. An energy converter as claimed in claim 4, wherein the integration means comprises an integrator adapted to be charged or discharged by a current source which is proportional to the error signal.

14. An energy converter as claimed in claim 4, wherein the integration means comprises a switched-capacitor integrator.

15. An energy converter as claimed in claim 4, wherein the voltage-to-time converter comprises a capacitor, a switch, and a comparator having a first comparator input and a second comparator input, the capacitor being adapted to be charged by a constant current source (Icon) and connected to the first input of the comparator, the input to the voltage-to-time converter being connected to the second input of the comparator, and the switch being connected across the capacitor and arranged to discharge the capacitor between conversions.

16. An energy converter as claimed in claim 4, wherein the voltage-to-time converter comprises a voltage-to-current converter, a capacitor, a switch, and a comparator having a first comparator input and a second comparator input connectable to a reference voltage, the input to the voltage-to-time converter being connected to the input of the voltage-to-current converter, the output of which is connected to both the capacitor and the first comparator input, and the switch being connected across the capacitor and arranged to discharge the capacitor between conversions.

17. An energy converter as claimed in claim 1 comprising a boost converter and wherein the voltage terminal is a voltage input.

18. An energy converter as claimed in claim 1 comprising a buck converter and wherein the voltage terminal is a voltage output.

19. An energy converter according to claim 1 wherein the energy converter is a switched mode energy converter.

20. An energy converter according to claim 1 wherein the energy converter is a resonant converter.

21. A method of controlling a switched-mode energy converter comprising a switch having a gate and a source and a drain connected to a switch node, an inductor connected between a voltage terminal and the drain and having an associated inductor current, the drain having an associated drain voltage, a driver for providing a drive signal to the gate, and a controller for controlling the driver, the switch being operable by the controller to conduct current between the drain and source during each of a plurality of primary strokes, the method comprising the steps of (a) determining a moment Tref which precedes a moment when the drain voltage next has a local minimum by a constant time interval $\Delta F$, (b) switching on the switch to commence the (n)th primary stroke at the end of an interval $\Delta T(n)$, which interval starts at the moment Tref; and (c) determining $\Delta T(n+1)$ in dependence on $\Delta T(n)$ and the drain voltage at the start of the n(th) primary stroke.

22. A method as claimed in claim 21, wherein step (c) comprises determining $\Delta T(n+1)$ in dependence on the drain voltage at the start of the (n)th primary stroke by means of an error signal, and further comprising the step of deriving the error signal from the drain voltage by differentiating the drain voltage, and sampling the differentiated drain voltage at the start of the primary stroke.

23. A method as claimed in claim 22, including the steps of processing the error signal by integration and converting the resulting integral to a time.

24. A method as claimed in 23, including the steps of detecting a peak in the ringing of the drain voltage corresponding to a start of the ringing of the drain voltage by (i) converting the drain voltage into a resonant current across a capacitor and (ii) comparing the current with a reference signal, and starting a voltage-to-time conversion at the start of the ringing of the drain voltage.

25. A method as claimed in claim 21, wherein step (a) comprises determining Tref as the start of a ringing of the drain voltage.

26. A method as claimed in claim 21, further comprising detecting a minimum in the drain voltage by direct valley detection means.

27. A method as claimed in claim 26, wherein the minimum in the drain voltage is detected by (i) converting the drain voltage into a resonant current across a capacitor and
(ii) comparing the current with a reference signal.

28. A method as claimed in claim 27, wherein the controller switches on the switch to commence the (n)th primary stroke at the earlier of (a) the end of an interval $\Delta T(n)$, which interval starts at the moment Tref, and (b) the moment the direct valley detection means determines a minimum in the drain voltage.

29. A method as claimed in claim 28, comprises the step of multiplexing a predetermined error Vx with the error signal.

* * * * *